Patented July 21, 1925.

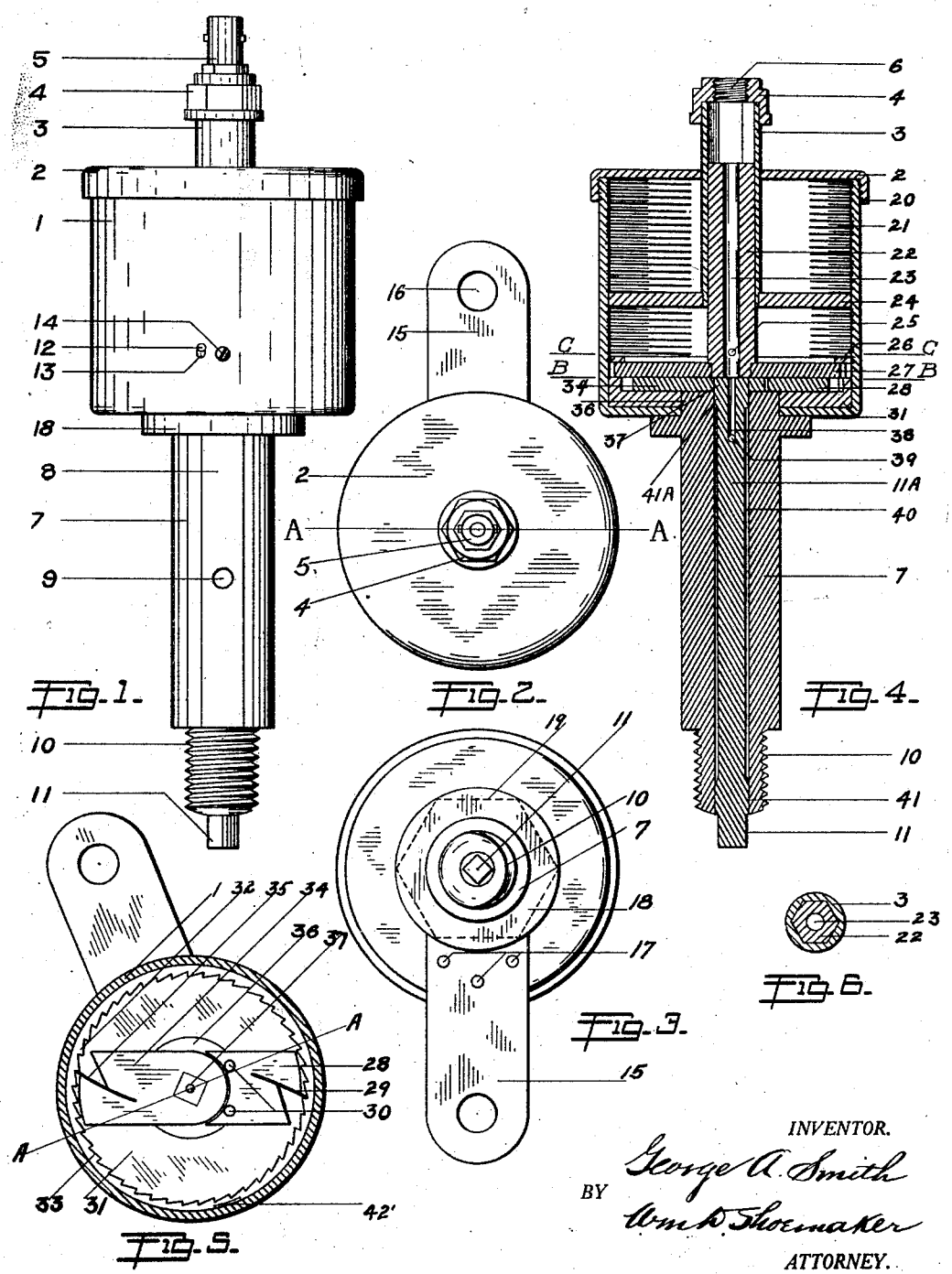

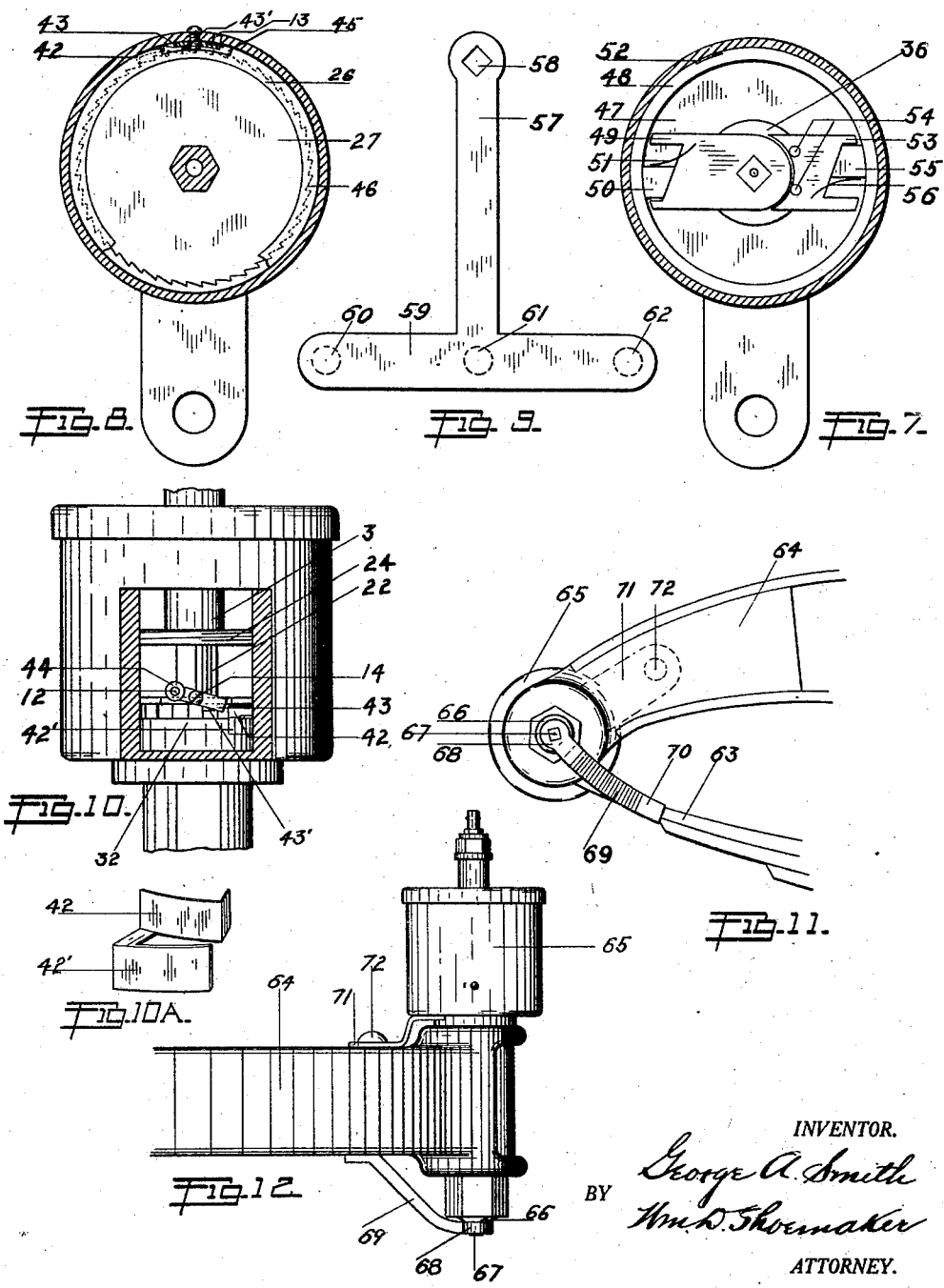

1,547,006

UNITED STATES PATENT OFFICE.

GEORGE A. SMITH, OF BALTIMORE, MARYLAND.

AUTOMATICALLY-OPERATED GREASE CUP.

Application filed April 8, 1924. Serial No. 705,053.

*To all whom it may concern:*

Be it known that I, GEORGE A. SMITH, a citizen of the United States, residing at Baltimore, State of Maryland, have invented certain new and useful Improvements in Automatically-Operated Grease Cups, of which the following is a specification.

This invention relates to grease cups and more particularly to such a cup which is automatically operated to discharge lubricant therefrom upon a relative movement of the parts thereof. The invention finds special application in automobiles, wherein grease cups are employed to lubricate pivots between two relatively movable parts, which pivots must be lubricated during the travel of the vehicle.

The object of the invention is to provide a grease cup which will discharge during the movement of parts it lubricates. Another object is the provision of a pivot bolt for relatively movable members of automobiles or the like with an attached grease cup which will provide proper lubrication of the pivot bolt during the travel of the vehicle. A still further object of the invention is the provision of means for communicating reciprocatory motion of relatively movable parts to a discharge element of the grease cup so that the discharge of lubricant will be in proportion to the amount of travel of the vehicle. A still further object is the improvement of the details of construction of such cups, whereby they may be applied to a variety of mechanical conditions.

Other objects and advantages of the invention will hereinafter appear in the following description and the novel features thereof will be particularly pointed out in the appended claims.

Like reference characters indicate like parts throughout the views of the drawings relating to the same form of the invention. In the drawings, Figure 1 is an elevation of a grease cup attached directly to the bolt with which it is used;

Figure 2 is a plan thereof;

Figure 3 is a bottom view;

Figure 4 is a vertical section through the cup as shown in Figure 1 taken on the line A—A of Figure 2;

Figure 5 is a horizontal section through the cup taken on the line B—B of Figure 4;

Figure 6 is a section through the follower and operating stems;

Figure 7 is a horizontal section similar to Figure 5 showing a modified form of advancing mechanism;

Figure 8 is a horizontal section through the cup taken on the line C—C of Figure 4;

Figure 9 is a view of a lever member used in operating the cup;

Figure 10 is a side elevation of the central portion of the cup with a section of the outer wall removed illustrating the operation of the automatic release;

Figure 10$^A$ is a perspective of the spring finger;

Figure 11 is a side elevation of one end of a vehicle spring with my grease cup and bolt attached thereto;

Figure 12 is a plan of the same.

The invention has been shown and described in several modified forms, all illustrative of the spirit thereof. It will be understood that further modifications may be made within the scope of the appended claims without departing from the spirit of the invention.

Proceeding at once to a detailed description of the cup construction, reference is had to Figures 1 to 10. The casing or shell 1 has a cover 2, secured to the upper end of the casing by screw threads, the two forming the complete outer shell of the cup proper. A cylindrical stem 3 movable rotatively and slidably through a close fitting opening in the cover 2, by mechanism to be described, is provided with a polygonal end 4 for the application of a wrench. The stem end 4 is provided with a screw threaded recess 6, in which may be secured any standard type of grease filling nipple provided with a check valve for grease under high pressure, as the alemite, designated by the numeral 5.

The grease cup proper is fastened at its bottom directly to the headed end of the bolt 7, which is provided with the customary flat side 8, lubricant outlet 9 and screw threaded end 10. Projecting through the center of the bolt end 10 is the polygonal end 11 of the rod 11$^A$ extending through the bolt 7 and connected with the advancing mechanism in the cup.

Projecting through a slot 13 in the wall of the cup is a releasing detent 12 fastened upon the inside of the cup upon a member pivoted to the wall at 14.

To the bottom of the outer shell or casing is fastened the bracket 15 provided with an aperture 16 through which a bolt or rivet may be passed for securing the cup in stationary relationship with one of pivoted members, the pivot of which it is desired to lubricate. This bracket is fastened to the bottom of the cup by means of the rivets 17, its end fitting against the flanged head 18 of the bolt 7. The head 18 of the bolt may be polygonal in shape instead of round as shown in dotted lines at 19 in Figure 3. In that case it might be possible to omit the bracket 15 and hold the cup in stationary relationship with the pivot member by providing the member itself with a lug or projection to fit tightly against one of the flat sides of the head of the bolt.

Referring now to the interior construction and mechanism of the cup, the numeral 20 designates the screw threads by which the cover 2 is securely fastened to the shell 1, and 21 the interior screw threads upon the shell. Rising vertically in the center of the cup is the operating stem 22 provided through its center with a bore 23 and lubricant outlet 25. The operating stem has a polygonal outer wall so as to be slidably mounted but nonrotatably mounted within the similar polygonal bore in the outer stem 3, as shown best in Figure 6. The sliding stem 3 is secured at its lower end to a follower 24, the periphery of which is screw threaded to cooperate with the screw threads 21 of the casing wall, to advance the same within the casing upon rotative movement of the follower.

The operating stem 22 is secured at its lower end to the top operating disc 27 which is held in its proper position by a lock ring 26. This locking ring is in screw threaded contact with the interior wall of the casing and is held against rotation with respect to the casing wall by having the pivot screw 14 bind upon the ring at the pocket 45.

From the foregoing description it will be seen that a rotative movement of the operating stem 22 will be communicated to the follower 24, which will result in an advancing movement in said follower to reduce the size of the lubricant chamber and thereby force lubricant therefrom. To produce such rotative movement in the operating stem 22, I have provided an advancing mechanism which comprises a lever 34 mounted upon the end 37 of the rod 11$^A$, and a flanged disc 31. The lever 34 is designed to advance the flanged disc, which in turn advances the operating disc 27. These parts will now be described in more detail.

Resting on the bottom of the cup, which it fits neatly, and adapted to revolve about the projecting end 36 of the bolt is the disc 31, flanged at 32, and provided with the saw teeth 33 upon its interior surface. Bearing upon the bolt end 36 and the flanged disc 31 is the lever 34, fastened upon the polygonal end 37 of the rod 11$^A$. It will be noted that the operating rod 11$^A$, whose projecting end 11 extends beyond the end of the bolt 7, is turned down or of reduced diameter except at the ends 41 and 41$^A$, which act as bearings. This reduced portion provides a lubricant conduit 40. It will be noted that the upper end of the rod is provided with the conduit 38 and outlet 39 to admit lubricant to the conduit 40.

The lever 34 is provided with a ratchet spring 35 for engaging the teeth 33. Also bearing upon the bolt end 36 and flanged disc 31 and fastened to the end 36 by the rivets 30 is the lock 28 provided with a locking spring 29. The advancing lever 34 and lock 28 are so arranged that when the disc 31 is advanced by the spring 35 bearing against one of the teeth 33, retrograde movement of the flanged disk will be prevented when the lever 34 is returned to its normal position, by the spring 29 in lock 28.

Carried by the flanged disc 31 in a pocket formed in the outer edge thereof, is an element 42 having a spring finger adapted to lie normally against the wall of the casing. But during the rotation of the flanged disc, this spring finger, under the influence of the cam 43, is caused to engage with the saw teeth 46 of the operating disc 27, and during a small portion of the rotation of the flanged disc, the operating disc will be driven. The finger is made of spring material and is split partly through, the lower portion 42' being fastened in the pocket and the upper portion being left free except where joined at the end to the lower portion.

The cam is formed as part of the lever pivoted upon the screw 14, and it lies within a cut-away portion 45 of the ring 26. This lever is designed to pivot for the purpose of raising the cam out of the pathway of the spring finger to render the same inoperative. This pivoting of the lever can be accomplished by depressing the projecting end 12 by means of a screwdriver, and it will be noted that provision has been made in the washer 44 to prevent leakage of lubricant through the wall of the casing at this point. But the lever will be depressed automatically in the operation of the device when the follower 24 reaches its lower limit of movement by striking against the normally raised end of the lever.

Retrograde movement of the disc 27 is prevented by the spring 43', fastened to the end of the lever 43. It is clear that as the finger 43 passes the spring 43', it will be disengaged, returning to its normal position after said passage.

In order to secure reciprocatory movement in the rod 11$^A$, there is provided a connector attached to the projecting end 11 of the rod and extending to one of the movable parts, the cup itself being secured to the other. For this purpose I have provided a T-shaped connector having a stem 57 and cross piece 59. In the upper end of the stem 57 is provided a polygonal aperture 58, which fits the polygonal end 11 of the rod. In the cross piece 59 holes 60, 61 and 62 may be provided for attaching purposes, or the two ends of the cross piece may be bent in any shape to encircle or fit the part to which it is to be attached. The particular shape or form of the connector is immaterial and that shown is only indicative of the element. Other forms or shapes may be provided dependent upon the necessities of the situation.

In Figure 7 I have shown a slight modification of certain elements of the advancing mechanism, namely, the flanged disc, advancing lever and lock, substituting wedges for the spring elements and saw teeth. The flanged disk 47 is provided with a plain edge 48 designed to cooperate with wedges 50 and 55. The wedge 50 is carried in a pocket formed in the bifurcated end of the lever 49, where it is normally held against the face 48 by the spring 51. The operation of the lever 49 is similar to that described in connection with the preferred form, the wedge 50 frictionally engaging with the face 48 to advance the disc 47, but freeing itself from such engagement upon a reverse movement of the lever. The wedge 55 lies in a pocket formed by the bifurcated end of the lock element 53, and this wedge will act, as will be apparent, to retain the disc against retrograde movement. Rivets 54 are employed to mount the lock upon the end 36 of the bolt, and the spring 56 normally maintains the wedge in locking relation with the face 48. The numeral 52 indicates a ratchet similar in all respects to that described in connection with the preferred form.

Two pivoted parts of an automobile chassis are shown in Figure 11, namely, the end of the spring 63 and the end of the frame 64. Figure 12 is a plan of the same but only shows the frame. It will be seen that the cup proper 65 is secured to one of the pivoted parts, the frame 64, by the rivet 72 passing through the bracket 71 of the cup. The bolt 66 is used as a pivot and the end 67 of the operating rod projecting from the bolt is attached to the end 68 of the connector 69, the other end 70 of the connector being attached to the spring 63. It is obvious that, as the cup 65 is fastened stationarily to the frame 64, any motion of the pivoted parts will be transmitted by lever 69 to the operating rod 67. The operating rod will transmit this reciprocating motion to the mechanism within the cup in the manner heretofore described.

To load the cup, the projecting end 12 of the release lever is depressed to the bottom of the slot 13, when the follower 24 may be screwed to its uppermost position by means of any suitable wrench applied to the end 4 of the operating stem. In this condition the cup is filled by the application of any standard high pressure gun and a nipple screwed into the socket 6. At this point the projecting end of the release lever is raised to its uppermost position in the slot 13.

Upon motion of the pivoted parts, a reciprocating movement will be given to the rod 11ᴬ, which will be transmitted through the lever 34 to the flanged disc 31, which in turn will transmit it to the operating disc 27 and through the stem 22 to the follower 24. It will be seen that there is a great reduction in the amount of movement between the flanged disc and the operating disc. This reduction may be made great or small according to the design of the cam 43. It will be appreciated that in loading the lubricant will pass from conduit 23 through the aperture 25 into the chamber proper, and that during the operation of the cup lubricant will be forced back through the aperture 25 and through the conduit 38 and aperture 39 into the conduit 40 and through the aperture 9 in the side of the bolt.

Having described my invention, what I claim as new and desire to secure by Letters Patent is:

1. The combination of a pivot bolt, of a grease cup supported at one end thereof, an element controlling the discharge of lubricant from said cup, and means comprising a rod passing through said bolt for actuating said discharge element.

2. The combination of a pivot bolt, of a grease cup, and means for forcing lubricant from said cup directly to said bolt comprising a rod passing through said bolt.

3. The combination of a pivot bolt, of a grease cup carried at one end thereof, a force feed element within the cup for discharging lubricant therefrom, and an actuator for said force feed element comprising a rod passing through said bolt.

4. The combination of a pivot bolt, of a grease cup carried at one end thereof, a force feed element within the cup for discharging lubricant therefrom, means for imparting a rotary motion in one direction to said force feed element comprising a rod and an advancing mechanism.

5. The combination of a pivot bolt, of a grease cup carried at one end thereof, a force feed element within the cup adapted to be rotated in one direction to discharge lubricant from the cup, and means for imparting motion to said force feed element comprising a rod adapted to be oscillated and motion-reducing mechanism between said rod and said force feed element.

6. The combination of elements specified in claim 5 having means for arresting the movement of said force feed element when it reaches the end of its discharging movement.

7. A pivot bolt for an automobile spring shackle or the like having a bore constituting a lubricant conduit, a rod in the bore of said bolt adapted to be oscillated upon a movement of the automobile, a grease cup mounted with its discharge nipple in communication with the bore in the bolt, means for forcing lubricant through said discharge nipple, and means for controlling the flow of the lubricant by movements of said rod.

8. The combination of elements specified in claim 7 having motion-reducing means between the rod and the force feed element, whereby the discharge of lubricant is relatively slight as compared with the amount of movement of the vehicle.

9. The combination of elements specified in claim 7 having an advancing mechanism between the rod and the force feed element whereby only motion in one direction in the rod is transmitted to the force feed element.

In testimony whereof I affix my signature.

GEORGE A. SMITH.